US011551437B2

(12) United States Patent
Lourentzou et al.

(10) Patent No.: US 11,551,437 B2
(45) Date of Patent: Jan. 10, 2023

(54) COLLABORATIVE INFORMATION EXTRACTION

(71) Applicant: International Business Machines Corporation, Armonk, NY (US)

(72) Inventors: Ismini Lourentzou, Urbana, IL (US); Anna Lisa Gentile, San Jose, CA (US); Daniel Gruhl, San Jose, CA (US); Alfredo Alba, Morgan Hill, CA (US); Petar Ristoski, San Jose, CA (US); Chad Eric DeLuca, Morgan Hill, CA (US); Linda Ha Kato, San Jose, CA (US); Chris Kau, Mountain View, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 16/425,584

(22) Filed: May 29, 2019

(65) Prior Publication Data
US 2020/0380311 A1 Dec. 3, 2020

(51) Int. Cl.
G06V 10/774 (2022.01)
G06K 9/62 (2022.01)
G06N 3/04 (2006.01)
G06F 40/169 (2020.01)
G06V 10/778 (2022.01)

(52) U.S. Cl.
CPC ........ *G06V 10/7753* (2022.01); *G06F 40/169* (2020.01); *G06K 9/6257* (2013.01); *G06K 9/6259* (2013.01); *G06K 9/6264* (2013.01); *G06N 3/0427* (2013.01);
(Continued)

(58) Field of Classification Search
CPC .......... G06V 10/7747; G06V 10/7753; G06V 10/7788; G06N 3/0427; G06N 3/0454
See application file for complete search history.

(56) References Cited

U.S. PATENT DOCUMENTS 8,131,756 B2  3/2012  Carus et al.
8,612,373 B2  12/2013  Chidlovskii
(Continued)

FOREIGN PATENT DOCUMENTS

EP          1717737          11/2006

OTHER PUBLICATIONS

Settles, B., "Active Learning Literature Survey", Computer Sciences Technical Report 1648, Jan. 26, 2010.
Baram, Y., et al., "Online Choice of Active Learning Algorithms", Journal of Machine Learning Research 5 (2004), 255-291, Mar. 2004.
(Continued)

*Primary Examiner* — Daniel G Mariam
(74) *Attorney, Agent, or Firm* — Lieberman & Brandsdorfer, LLC

(57) ABSTRACT

Embodiments relate to a system, program product, and method for information extraction and annotation of a data set. Neural models are utilized to automatically attach machine annotations to data elements within an unlabeled data set. The attached machine annotations are evaluated and a score is attached to the annotations. The score reflects a confidence of correctness of the annotations. A labeled data set is iteratively expanded with selectively evaluated annotations based on the attached score. The labeled data set is applied to an unexplored corpus to identify matching corpus data to populated instances of the labeled data set.

18 Claims, 7 Drawing Sheets

(52) U.S. Cl.
CPC ....... *G06N 3/0454* (2013.01); *G06V 10/7747* (2022.01); *G06V 10/7788* (2022.01)

(56) References Cited

U.S. PATENT DOCUMENTS

| | | | |
|---|---|---|---|
| 9,672,205 | B2 | 6/2017 | Miller |
| 9,779,081 | B2 | 10/2017 | Simard et al. |
| 2005/0071301 | A1 | 3/2005 | Kuroiwa |
| 2005/0165789 | A1 | 7/2005 | Minton et al. |
| 2007/0011127 | A1 | 1/2007 | Yamashita et al. |
| 2011/0282169 | A1 | 11/2011 | Grudic et al. |
| 2016/0078359 | A1 | 3/2016 | Csurka et al. |
| 2020/0250527 | A1* | 8/2020 | Zhao ................. G06N 7/005 |
| 2021/0271974 | A1* | 9/2021 | Ding ................. G06N 3/04 |

OTHER PUBLICATIONS

Hsu, W., et al., "Active Learning by Learning", American Association for Artificial Intelligence Conference, 2015.

Chu, H., et al., "Can Active Learning Experience be Transferred?", Data Mining (ICDM), IEEE 16th International Conference on IEEE, Aug. 2016.

Huang, S., et al., "Transfer Learning with Active Queries from Source Domain", Proceedings of the 25th International Joint Conference on Artificial Intelligence (IJCAI), 2016.

Konyushkova, K., et al., "Learning Active Learning from Data", Advances in Neural Information Processing Systems, 2017.

Woodward, M., et al., "Active One-shot Learning", arXiv:1702.06559, Feb. 2017.

Contardo, G., et al., "A Meta-Learning Approach to One-Step Active-Learning", arXiv:1706.08334, Jul. 2017.

Pang, K., et al., "Meta-Learning Transferable Active Learning Policies by Deep Reinforcement Learning", arXiv:1806.04798, Jun. 12, 2018.

Fang, M., et al., "Learning how to Active Learn: A Deep Reinforcement Learning Approach", arXiv:1708.02383, Aug. 8, 2017.

Liu, M., et al., "Learning How to Actively Learn: A Deep Imitation Learning Approach", Proceedings of the 56th Annual Meeting of the Association for Computational Linguistics, pp. 1874-1883, Jul. 15-20, 2018.

Chen, C., et al., "Learning How to Self-Learn: Enhancing Self-Training Using Neural Reinforcement Learning", arXiv:1804.05734, Apr. 16, 2018.

Wu, J., et al., "Reinforced Co-Training", arXiv:1804.06035, Apr. 17, 2018.

\* cited by examiner

COLLABORATIVE INFORMATION EXTRACTION

BACKGROUND

The present embodiments relate to cognitive processing and active learning. More specifically, the embodiments relate to optimizing one or more active learning algorithms to optimize information extracting and annotation from a large data set, such as those used in visual recognition, natural language processing, machine-aided human translation, weather reporting, etc. The active learning shown and described herein re-utilizes one or more previously trained model for similar tasks, thereby leveraging the knowledge and work previously entailed and decreasing annotations for new tasks.

SUMMARY

The embodiments include a system, computer program product, and method for information extraction and annotation of a data set.

In one aspect, a system is provided with an artificial intelligence (AI) platform and one or more associated tools embedded therein for information extraction and annotation of a data set. A processing unit is operatively coupled to memory and is in communication with the AI platform and the embedded tools, including a machine learning (ML) manager, a data selector, a director, and an applicator. The ML manager functions to apply an unlabeled data set to two or more neural models to automatically attach machine annotations to data elements within the unlabeled data set. The data selector functions to evaluate the attached machine annotations for accuracy, and utilizes a calibration model to assign a score to each machine annotation, with the score to reflect a confidence of correctness of the machine annotation(s). The director functions to calibrate the data selector, which includes iteratively expanding a labeled data set of a selection of evaluated machine annotations based on the score attached to each machine annotation. The applicator functions to apply the iteratively expanded labeled data set to an unexplored corpus, and to identify matching corpus data to populated instances of the labeled data set.

In another aspect, a computer program device is provided for information extraction and annotation of a data set. The program code is executable by a processing unit to apply an unlabeled data set to two or more neural models, with the models to automatically attach machine annotations to data elements within the unlabeled data set. The program code trains a machine learning model to evaluate the attached machine annotations and attach a score to each machine annotation, with the score to reflect a confidence in the correctness of the individual machine annotations. Program code is further provided to calibrate the machine learning model, and iteratively expands a labeled set with selective evaluated annotations based on the score attached to individual machine annotations. Program code applies the iteratively expanded labeled data set to an unexplored corpus to identify matching corpus data to populated instances of the labeled data set.

In yet another aspect, a method is provided for information extraction and annotation of a data set. An unlabeled data set is applied against two or more neural models. The neural models automatically attach machine annotations to data elements within the unlabeled data set. A machine learning model is trained to evaluate the attached machine annotations, which includes attaching a score to each machine annotation. The score reflects a confidence of correctness of the individual machine annotations. The machine learning model is subject to calibration, which includes iteratively expanding a labeled data set with selective evaluated annotations based on the score attached to the individual machine annotations. The iteratively expanded labeled data set is applied to an unexplored corpus to identify matching corpus data to populated instances of the labeled data set.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
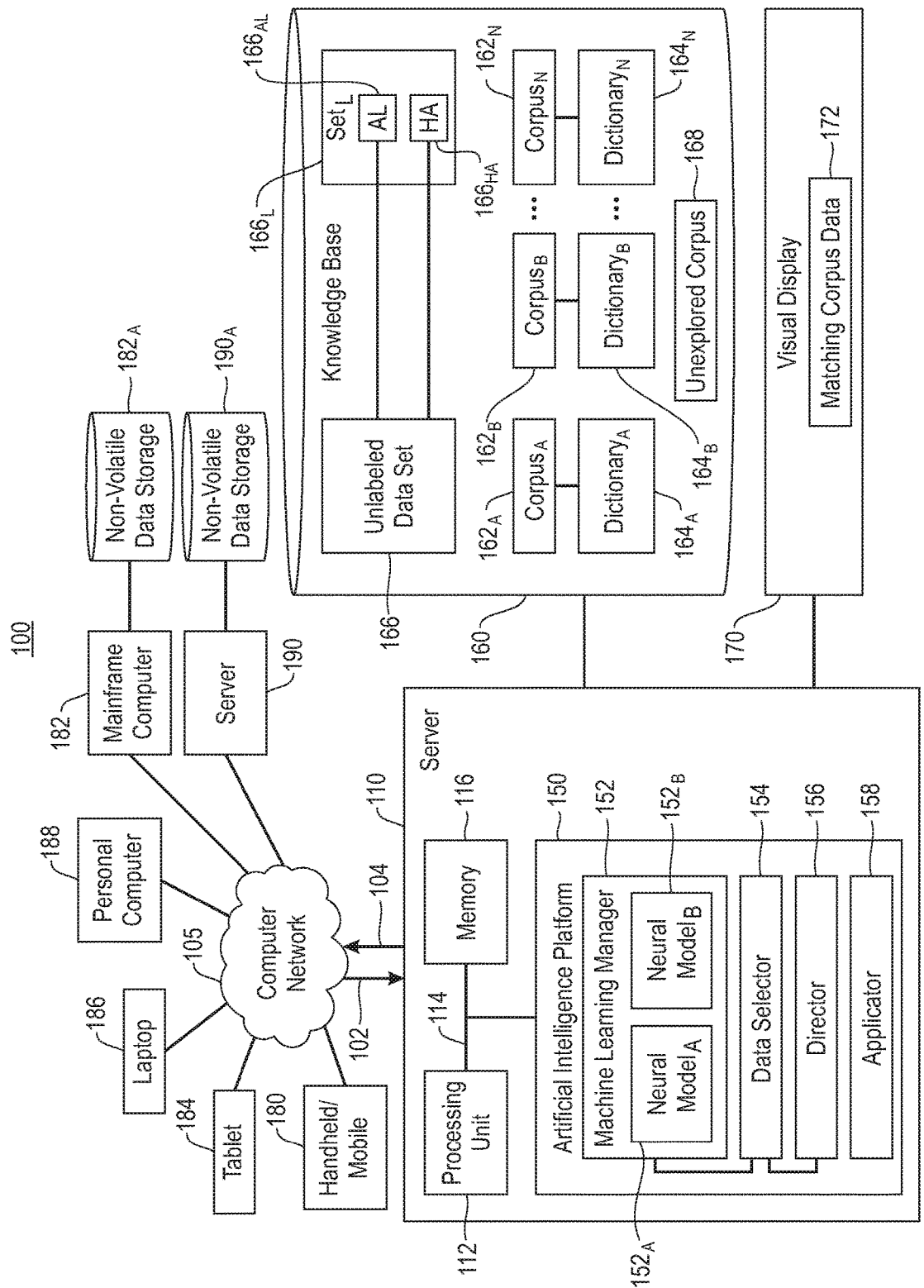
FIG. 1 depicts a system diagram illustrating a system connected in a network environment that supports active learning application to dictionary membership management and iterative dictionary expansion.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent systems, natural language processing systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Large annotated datasets for information extraction are not always available. Active learning is a category of machine learning which employs an algorithm to interactively query a user to obtain a desired output at new data points. Specifically, active learning is a framework in which the learner has the freedom to select which data points are added to its training set. Active learning may begin with a small quantity of labelled examples to select an additional set of examples for which labeling is requested, learn from the request, and then use knowledge to select additional examples for labeling. Accordingly active learning selects a relatively small but informative sample of data to annotate to produce a highly performant model.

As described in detail herein and demonstrated in the associated drawing figures, a framework referred to as collaborative cost-effective information extraction is provided to support an active learning strategy and enable learning multiple information extractions while limiting human annotation. An active learning component, referred to herein as an active learner, optimizes system performance by utilizing a learning to rank formulation. The active learner learns the impact of each example in terms of weight, and selectively leverages the weight(s) to expand a labeled data set, e.g. dictionary. As described in details herein, a combination of active learning heuristics and active learning learnable models are utilized for annotation of one or more data sets, together with dynamic adjustment of the heuristics and learned weights. The annotated data sets may be applied to a variety of scenarios to provide specific technical solutions.

Word vectors refer to a set of language modeling and feature learning techniques in natural language processing (NLP) where words or phrases from a vocabulary are mapped to vectors of real numbers. Words that share common context in a corpus are located or positioned in close proximity. It is understood in the art that word embedded algorithms are used to convert words to numerical vectors. A neural net based model, such as word2vec, RNN, LSTM, etc., converts words into equivalent vector representations. The word2vec is trained on an unsupervised corpus of data irrespective of any given context or domain. In one embodiment, one or more alternative algorithms may be utilized to numerically represent words, such as, but not limited to, recurrent neural networks (RNN) and long short-term memory (LSTM).

Dictionaries, ontologies, and linguistic resources, hereinafter collectively referred to as a dictionary, are the backbone of many information retrieval systems. Entries in the dictionary are leveraged to identify and extract information, e.g. text, within an unstructured text within a corpus that is linguistically relevant to a corresponding query. However, construction and maintenance of the dictionary is challenging. Introduction of unnecessary errors into the dictionary may limit potential recall of the extraction. At the same time, a dictionary with a static set of terms may not be desirable in that the dictionary does not evolve, and as such, when applied to a text corpus may not properly recall and extract relevant text.

Referring to FIG. 1, a schematic diagram of a computer system (100) to support active learning application to dictionary membership management and iterative dictionary expansion. In one embodiment, the term labeled data set is interchangeable with the term dictionary. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) with embedded tools to support and enable iterative expansion of the dictionary over the network (105) from one or more of the computing devices (180), (182), (184), (186), (188), and (190). The server (110) is shown herein operatively coupled to a knowledge base (160). Each of the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In addition, each of the computing devices (180)-(190) is operatively coupled to the knowledge base (160) across the network (105). Other embodiments of the server (110) may be used with components, systems, sub-systems, and/or devices other than those that are depicted herein.

The AI platform (150) is shown herein configured with tools to manage and facilitate application of active learning to dictionary membership, and more specifically to support automated or semi-automated expansion of the dictionary. As shown, the knowledge base (160) is operatively coupled to the AI platform (150). The knowledge base (160) and is configured with a plurality of text corpus, shown herein as corpus$_A$ (162$_A$), corpus$_B$ (162$_B$), and corpus$_N$ (162$_N$). In addition, the knowledge base (160) is shown with a set of dictionaries (164), e.g. labeled data sets, (164$_A$), (164$_B$), and (164$_N$), which are individually and operatively coupled to the plurality of text corpus. The quantity of dictionaries shown herein is for illustrative purposes and should not be considered limiting. In one embodiment, a single dictionary may be populated in the knowledge base. In one embodiment, the individual dictionaries ($164_A$), ($164_B$), $^{and}$ ($164_N$) are referred to as domain specific dictionaries, with each dictionary subject to expansion and active learning. Each dictionary includes one or more text based terms, referred to herein as dictionary instances. As the dictionary is applied to a designated or assigned corpus by the tools of the AI platform (150), the dictionary instances are utilized to identify text within the corpus that is relevant. In one embodiment, the dictionary may be applied to more than one corpus. Accordingly, the AI platform (150), and more specifically the tools that comprise the AI platform (150), functions to employ active learning to selectively manage dictionary membership.

The tools that comprise the AI platform (150), including a machine learning (ML) manager (152), a data selector (154), and a director (156) to manage active learning, and an applicator (158) to apply one or more expanded dictionaries to an unexplored corpus, such as $corpus_A$ ($162_A$), $corpus_B$ ($162_B$), or $corpus_N$ ($162_N$). The ML manager (152) is shown operatively coupled to two neural models, including $model_A$ ($152_A$) and $model_B$ ($152_B$). As shown and described below, $model_A$ ($152_A$) is a Named Entity Recognition (NER) neural model and $model_B$ ($152_B$) is a Relation Extraction (RE) neural model. The use of the NER and RE models are for illustrative purposes, and in one embodiment, different neural models may be employed or substituted in placed of these models. The NER model is a long-short term memory-convolutional neural network-conditional random field (LSTM-CNN-CRF) combination. The NER model generates entity candidates which are likely to express a relation. The RE model learns one relation at a time and assesses if the candidates actually express a relation. In one embodiment, additional or alternatively neural models may be operatively coupled to the ML manager (152). The neural models are run on data in vector form, with each model to preliminarily and automatically apply machine generated annotations to data elements within an unlabeled data set (166).

The neural models ($152_A$) and ($152_B$) process the unlabeled data either simultaneously or near-simultaneously. Specifically, $model_A$ ($152_A$), shown herein as the NER Model, receives the unlabeled data set (166) and annotates the data therein, and simultaneously or near simultaneously, $model_B$ ($152_B$), shown herein as the RE Model, receives the unlabeled data set (166) and annotates the data therein. The data selector (154), which is operatively coupled to the ML manager (152), evaluates the preliminarily attached machine generated annotations with respect to accuracy. Specifically, the data selector (154) assigns a score to each annotation, with the score to reflect confidence of correctness of the individual machine generated annotations. The confidence score attached to the annotations is shown herein to include a value of 0, 1, or 2, where 0 represents annotations to discard, 1 represents annotations to send to a subject matter expert (SME), and 2 represents annotations to add to a machine labeled data set, L. In one embodiment, a different scale of confidence scores attached to the machine generated annotations may be employed, and as such, the confidence scores and associated scaling shown herein should not be considered limiting. Accordingly, each of the neural models separately annotates unlabeled data and the data selector (154) evaluates the machine generated annotations and assigns an individual ranking to each machine generated annotation.

The data selector (154) functions separate from the NER and RE models, and more specifically, functions to evaluate the machine generated annotations and assign a confidence score to each annotation, with the confidence score reflecting confidence by the data selector (154) that the machine generator annotation(s) is correct. The data selector (154) is subject to calibration. As shown, the director (156) is operatively coupled to the data selector (154). The director (156) functions to manage and enable iterative expansion of one or more labeled data sets, also referred to herein as dictionaries, ($164_A$), ($164_B$), and ($164_N$). The director (156) selects two subsets of machine generated annotations from the unlabeled data set (166), including a first subset identified as set AL ($166_{AL}$) from which machine annotations having a confidence score of 2 are assigned, and a second subset identified as set HA ($166_{HA}$) from which machines annotations having a confidence score of 1 are assigned. The director (156) supports or otherwise enables the data in set HA ($166_{HA}$) to revert back to their original format, e.g. non-vector form, and forwards the non-vector form of the data in set HA ($166_{HA}$) to a subject matter expert (SME) for annotation, e.g. human in the loop, HumL. Thereafter, the director (154) merges data that populates the set AL ($166_{AL}$) and the SME annotated data in the set HA ($166_{HA}$) and forms a new annotated set, L, ($166_L$). The director (156) removes all of the now annotated data in set L (1660 from the unlabeled data set (166), e.g. U =U–L. As a set of accepted annotated data, which in one embodiment may be a combination of machine annotations and SME annotations, is identified by the director (154) and removed from the unlabeled data set (166), a new or re-formulated unlabeled data set, U, is formed. Accordingly, the director (156) selectively and iteratively expands the labeled data set by leveraging the scores attached to the individual machine generated annotations.

The newly formulated or populated data set L ($166_L$) is subject to processing. The director (156) identifies the quantity of annotations populated in data set L. The ML manager (152) converts the annotations in data set L into vector format, e.g. vector representation, to support and enable further processing by the neural models, e.g. the NER model ($152_A$) and the RE model ($152_B$). The vector form of data set L is passed to the neural models, e.g. ($152_A$) and ($152_B$), so that the neural models may leverage the data from the prior set of machine and/or SME generated annotations to further annotate unlabeled data, set U. Specifically, data set L is passed to the neural models ($152_A$) and ($152_B$) as a training platform for the next or subsequent iteration of annotation of unlabeled data that populates set U (166). The NER model ($152_A$) and RE model ($152_B$) separately and simultaneously, or near simultaneously, receive the unlabeled data set U (166) in vector format, and subject the received data to an automated annotation process. For each annotated data in the data set from the NER model ($152_A$), the data selector (154) evaluates the individual annotations and attaches a confidence score to each of the individual annotations. Similarly, for each annotated data in the data set from the RE model ($152_B$), the data selector (154) evaluates the individual annotations and attaches a confidence score to each of the individual annotations. The confidence score reflects the evaluation conducted by the data selector (154). Accordingly, the neural models ($152_A$) and ($152_B$) leverage annotated data from the previously annotated data to conduct the current annotation of the unlabeled data set.

The confidence score attached to the annotations by the data selector (154) is shown herein to include a value of 0, 1, or 2, where 0 represents annotations to discard, 1 represents annotations to send to a subject matter expert (SME), and 2 represents annotations to add to a machine labeled data set, L ($166_L$). The director (156) iteratively expands the labeled data set ($166_L$). The size of the data set L (1660 has a configurable threshold to ensure that the size of the set is manageable and does not affect efficiency with respect to machine enabled annotating. Until the quantity of annotations in set L (1660 meets or exceeds the threshold, annotations are iteratively added to set L ($166_L$). The director (156) manages the iterative expansion of the labeled data, and starts with accepting the machine generated annotations having a confidence score of 2, followed by the annotations having a confidence score of 1 with the annotations attached by the SME. The process of annotating and training continues until the threshold for labeled set L ($166_L$) is reached. Once the threshold has been reached, the active learning process ends for the unlabeled set (166). Accordingly, the ML manager (152), the data selector (154), and the director (156) function to apply active learning to dictionary expansion using neural models.

As shown, the director (156) functions to facilitate and enable an iterative expansion of the dictionary, and more specifically, an expansion of the instances that populate one or more of the dictionaries. It is understood that the expansion of the dictionary includes the director (156) to selectively add annotated instances to the dictionary, thereby augmenting the dictionary. In one embodiment, the iterative expansion includes two passes, including a first pass to discover new annotations generated by one or both of the neural models ($152_A$) and ($152_B$), and a second pass to generate new annotations by an SME. As discussed herein, the dictionary expansion is iterative. In one embodiment, the director (156) enables expansion by the first pass followed by the second pass, although this order of expansion or application should not be considered limiting. Similarly, in one embodiment, the subject matter expert (SME) performs an adjudication of a proposed annotated instance after each of the iterations. Accordingly, the director (156) manages the expansion of the dictionary with respect to the annotation membership.

The tools shown and described in FIG. 1 create and utilize a co-training active learning pipeline for two neural models ($152_A$) and ($152_B$), shown herein as NER and RE, to extract entities and their relations from text. The data selector (154) functions to continuously train the neural models while assisting knowledge curators (SMEs) in their task of maintaining an up-to-date annotated data set, e.g. dictionary. The automated information extraction techniques supported by the active learning is language neutral. Specifically, the active learning shown herein does not use natural language parsing with parts of speech tagging. The data selector (154) evaluates the annotations and determines which annotations are suited for automatic extraction without further feedback, which annotations should be manually annotated, and which annotations should be discarded entirely.

As shown, an applicator (158) resides in the AI platform (150) and is operatively coupled to the knowledge base (160). Each labeled set ($166_L$) forms a dictionary. In the example shown herein, the knowledge base (160) includes a plurality of dictionaries, including dictionary$_A$ ($164_A$), dictionary$_B$ ($164_B$), and dictionary$_N$ ($164_N$). The applicator (158) selects and applies one of the dictionaries to a designated or assigned corpus, such as corpus$_A$ ($162_A$), corpus B (162B), or corpus$_N$ ($162_N$) to identify matching corpus data to populated annotations. In one embodiment, the dictionary may be applied to more than one corpus. As shown herein, a visual display (170) is operatively coupled to the server (110). The matching corpus data (172) is shown selectively presented on the visual display (170). Accordingly, the applicator (158) functions to apply the formed dictionary to one or more corpus.

The various computing devices (180), (182), (184), (186), (188), and (190) in communication with the network (105) may include access points for the text corpus, shown herein as corpus$_A$ ($162_A$), corpus ($162_B$), and corpus$_N$ ($162_N$) of the knowledge base (160) and the corresponding domain-specific dictionaries, shown herein as dictionaries ($164_A$), ($164_B$), and ($164_N$). The AI platform (150) functions to manage iterative expansion of the dictionaries, which in one embodiment may be domain specific dictionaries, and applications of one or more iteratively expanded dictionaries to an unexplored or selected corpus. Application of the domain-specific dictionary is managed by the applicator (158) and identifies matching corpus data (172), also referred to herein as output data. In one embodiment, the AI platform (150) communicates the matching corpus data (172) to a visual display (170), shown herein operatively coupled to the server (110) or one or more of the computing devices (180)-(190) across network connection (104).

The network (105) may include local network connections and remote connections in various embodiments, such that the AI platform (150) may operate in environments of any size, including local and global, e.g. the Internet. The AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, one or more of the corpus, e.g. corpus$_A$ ($162_A$), corpus ($162_B$), and corpus$_N$ ($162_N$) of the knowledge base (160), may be in the form of one or more logically grouped documents or files. The knowledge base (160) may include structured and unstructured documents, including but not limited to any file, text, article, or source of data (e.g. scholarly articles, dictionary, definitions, encyclopedia references, and the like) for use by the AI platform (150). Content users may access the AI platform (150) via a network connection or an internet connection to the network (105). The applicator (158) submits or manages submission of a domain-specific dictionary to an appropriately classified corpus or an unexplored corpus or in one embodiment, a different corpus than that employed for the dictionary expansion. The applicator (158) effectively determines an output response by searching content in the unexplored corpus operatively coupled to the knowledge base (160) or any electronic data source operatively coupled to the server (110) across the network (105).

The AI platform (150) is shown herein with several tools to support active learning dictionary expansion and application. The tools, including the ML manager (152), the data selector (154), the director (156), and the applicator (158), either individually or collectively function as either a software tool or a hardware tool.

In some illustrative embodiments, server (110) may be the IBM Watson® system available from International Business Machines Corporation of Armonk, N.Y., which is augmented with the mechanisms of the illustrative embodiments described hereafter. The IBM Watson® system may support the tools (152)-(158) to support the iterative expansion of one or more domain-specific dictionaries through active learning, and application of the expanded dictionaries. Matching corpus data (172) is identified by applying the expanded dictionary to a select corpus, such as an unexplored corpus, and looking for portions of the unexplored corpus that have some potential for containing a response matching content characteristic(s) of the instances that populate the applied dictionary. The response output (172) is directed at specific content. For example, the response output (172) may be in the form of a link to a source for the response content. Similarly, in one embodiment, the response output (172) may include both content and the source link. Accordingly, the content of the response may come in different forms, or a combination of forms.

The ML manager (152), data selector (154), director (156), and applicator (158), collectively referred to as AI tools, are shown as being embodied in or integrated within the AI platform (150) of the server (110). The AI tools may be implemented in a separate computing system (e.g., 190) that is connected across network (105) to the server (110). Wherever embodied, the AI tools function to evaluate and iteratively expand the annotations that populate one or more domain-specific dictionaries, apply the expanded dictionary to an unexplored corpus, such as corpus (168), and identify and communicate response content (172).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various information handling systems or can be internal to one of the information handling systems.

The information handling system employed to support the AI platform (150) may take many forms, some of which are shown in FIG. 1. For example, AI platform may take the form of a desktop, server, portable, laptop, notebook, or other form factor computer or data processing system. In addition, the information handling system to support the AI platform (150) may take other form factors such as a personal digital assistant (PDA), a gaming device, ATM machine, a portable telephone device, a communication device or other devices that include a processor and memory. In addition, the information handling system need not necessarily embody the north bridge/south bridge controller architecture, as it will be appreciated that other architectures may also be employed.

Figure 2:
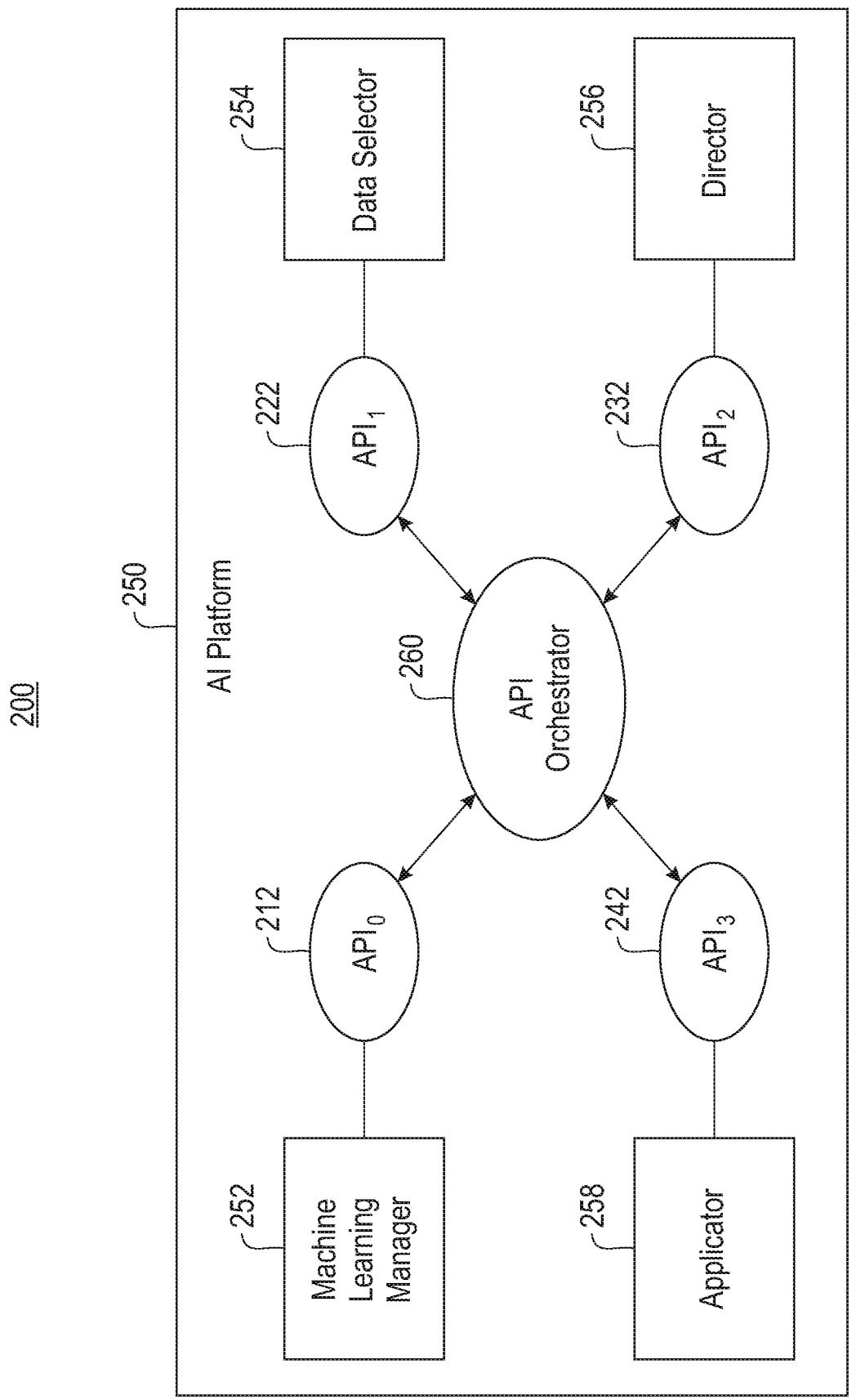
FIG. 2 depicts a block diagram illustrating the AI platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158) and their associated functionality. Referring to FIG. 2, a block diagram (200) is provided illustrating the tools (152)-(158) and their associated APIs. As shown, a plurality of tools are embedded within the AI platform (250), with the tools including the ML manager (252) associated with API$_0$ (212), the data selector (254) associated with API$_1$ (222), the director (256) associated with API$_2$ (232), and the applicator (258) associated with API$_3$ (242). Each of the APIs may be implemented in one or more languages and interface specifications. API$_0$ (212) provides functional support to apply an unlabeled data set to two or more neural models for automated annotation; API$_1$ (222) provides functional support to evaluate accuracy of the machine annotations; API$_2$ (232) provides functional support to iteratively expand a labeled data set with a selection of the evaluated annotations; and API$_3$ (242) provides a support for a technical application by applying the expanded labeled data set to an unexplored corpus to identify matching data. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
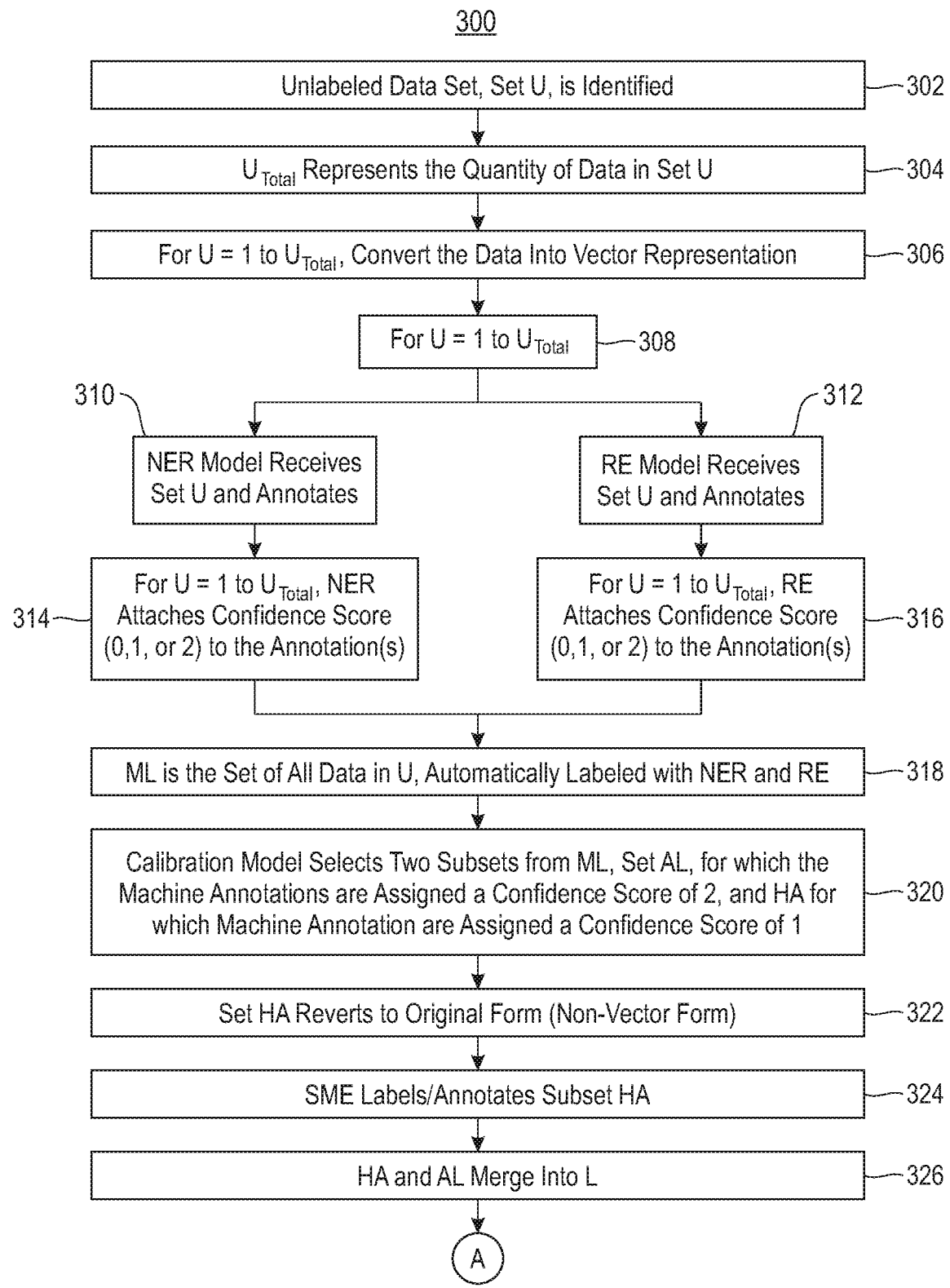
FIG. 3 depicts a flow chart illustrating a process for active learning annotation identification and application.
Figure 3:
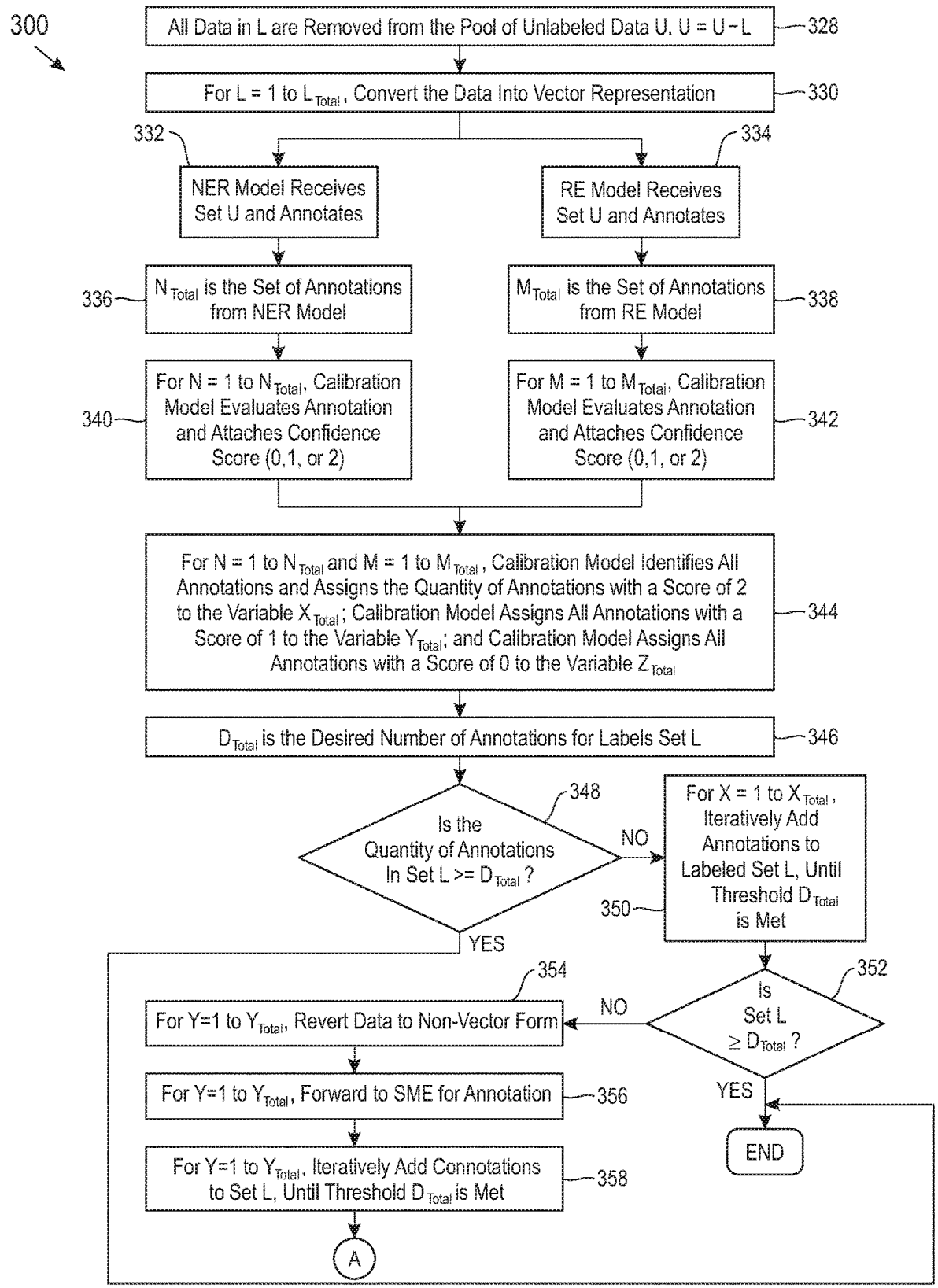

Referring to FIG. 3, a flow chart (300) is provided to illustrate a process for active learning annotation identification and application. An unlabeled data set, referred to herein as set U, is identified (302), where the variable U$_{Total}$ represents the quantity of data in set U (304). Each data in the unlabeled data set U is converted into vector representation (306). Two neural models are employed for sequence labeling and classification. As shown herein, the models include Named Entity Recognition (NER) and Relation Extraction (RE). The use of the NER and RE models are for illustrative purposes, and in one embodiment, different neural models may be employed or substituted in placed of these models. The NER model is a long-short term memory-convolutional neural network-conditional random field (LSTM-CNN-CRF) combination. The NER model generates entity candidates which are likely to express a relation. The RE model learns one relation at a time and assesses if the candidates actually express a relation.

The neural models are run on the vectorized form of the unlabeled data set U$_{Total}$ (308). The two neural models process the unlabeled data either simultaneously, e.g. in parallel, or near-simultaneously, e.g. near-parallel. Although the two neural models and their corresponding algorithms at steps (310) and (312) are shown in parallel, in one embodiment, they may be sequentially aligned. For example, in one embodiment, the neural model processing at step (310) may be an initial algorithm, and the neural model processing at step (312) may be a subsequent algorithm. As shown, the NER Model receives the unlabeled data set and annotates the data therein (310), and simultaneously or near simultaneously, the RE Model receives the unlabeled data set and annotates the data therein (312). For each annotated data in the data set U$_{Total}$, the calibration model evaluates the annotation and attaches a confidence score to each of the individual annotations (314). Similarly, for each annotated data in the data set U$_{Total}$, the calibration model attaches a confidence score to each of the individual annotations (316).

The unlabeled data set is separately annotated and evaluated by two different neural models, with each model providing a separate scoring of the annotations. The confidence score attached to the annotations is shown herein to include a value of 0, 1, or 2, where 0 represents annotations to discard, 1 represents annotations to send to a subject matter expert (SME), and 2 represents annotations to add to a machine labeled data set, L. In one embodiment, a different scale of confidence scores to attach to the annotations may be employed, and as such, the confidence scores and associated scaling shown herein should not be considered limiting. The variable ML is assigned to the set of all data in set U that has been automatically annotated with the NER and RE models (318). Accordingly, each of the neural models separately annotates unlabeled data and the calibration model evaluates the annotations and assigns an individual ranking to each machine created annotation, e.g. attaches a score or weight, of the unlabeled data in the unlabeled data set $U_{Total}$.

The calibration model functions separate from the NER and RE models, and functions to automatically identify acceptable machine annotations. As shown and described in FIG. 1, and illustrated herein, the calibration model is subject to training. The calibration model selects two subsets of annotated data from the ML set, including a first subset identified as set AL from which machine annotations having a confidence score of 2 are assigned, and a second subset identified as set HA from which machines annotations having a confidence score of 1 are assigned (320). The data corresponding to the annotations in set HA revert back to their original format (322), e.g. non-vector form, and are forwarded to an SME for annotation (324). Thereafter, the data that populates the set AL and the SME annotated data in HA are merged and form a new set, L, (326). All of the now annotated data in set L are removed from the unlabeled data set U (328), e.g. U=U–L. Accordingly, as a set of accepted annotated data, which in one embodiment may be a combination of machine annotations and SME annotations, is identified, the accepted annotated data is removed from the unlabeled data set, thereby forming a new or re-formulated unlabeled data set, U.

Following step (328), the newly formulated or populated data set, L, is subject to processing. The quantity of annotations in data set L is identified as $L_{Total}$. Each of the annotations in data set L is converted into vector format, e.g. vector representation, (330), and is then processed by the machine learning models, e.g. the NER model and the RE model. The vectorized form of data set L is passed to the machine learning models so that the machine learning models may leverage the data from the prior set of annotations to further annotate unlabeled data. Specifically, data set L is passed to the machine learning models as a training platform for the next or subsequent iterations of annotation of unlabeled data that populates set U. As shown at steps (332) and (334), the NER and RE models separately and simultaneously, or near simultaneously, receive the unlabeled data set U in vector format, and subject the received data to an automated annotation process. The variable $N_{Total}$ is assigned to the quantity of annotations formed from data set U from the NER model (336), and the variable $M_{Total}$ is assigned to the quantity of annotations formed from data set U from the RE model (338). For each annotated data in the data set $N_{Total}$, the calibration model evaluates the individual annotations and attaches a confidence score to each of the individual annotations (340). Similarly, for each annotated data in the data set $M_{Total}$, the calibration model evaluates the individual annotations and attaches a confidence score to each of the individual annotation (342). The confidence score reflects the evaluation conducted by the calibration model. As shown, the unlabeled data set, U, is separately and automatically annotated and then evaluated by the calibration model, with the NER and RE machine learning models leveraging data from the previously annotated data to conduct the current annotation.

The confidence score attached to the annotations by the calibration model is shown herein to include a value of 0, 1, or 2, where 0 represents annotations to discard, 1 represents annotations to send to a subject matter expert (SME), and 2 represents annotations to add to a machine labeled data set, L. The calibration model assigns all machine annotations in the unlabeled data set, U, with a confidence of 2 to the variable $X_{Total}$, assigns all machine translations in the unlabeled data set, U, with a confidence score of 1 to the variable $Y_{Total}$, and assigns all machines translations in the unlabeled data set, U, with a confidence score of 0 to the variable $Z_{Total}$ (344). The size of the data set L has a configurable threshold to ensure that the size of the set is manageable and does not affect efficiency with respect to machine enabled annotating. The variable $D_{Total}$ is configured or assigned to represent a threshold value of the quantity of annotations in set L (346). It is determined if the quantity of annotations in set L meets or exceeds the threshold, $D_{Total}$ (348). A negative response to the determination at step (348) is followed by iteratively adding the annotations in the set $X_{Total}$ to set L while ensuring that the threshold $D_{Total}$ is not exceeded (350). If all of the annotations in set $X_{Total}$ have been added to set L, it is again determined if the quantity of annotations in set L meets or exceeds the threshold $D_{Total}$ (352). A negative response to the determination at step (352) is followed by reverting the data corresponding to the annotations in set $Y_{Total}$ back to their original format (354), e.g. non-vector form, forwarding the data in set $Y_{Total}$ to an SME for annotation (356), and iteratively adding the annotations in set $Y_{Total}$ to set L While ensuring that the threshold $D_{Total}$ is not exceeded (358). The process then returns to step (328) for continued annotation and training. It is understood that a positive response to the determinations at steps (348) or (352) concludes the annotation and training process. Accordingly, the calibration models evaluates machine annotated data and selectively populates the machine annotated data set to teach and train neural models on accurately annotating unlabeled data.

The process shown and described in FIG. 3 creates and utilizes a co-training active learning pipeline for two neural models, shown herein as NER and RE, to extract entities and their relations from text. The calibration model functions to continuously train the neural models while assisting the knowledge curators (SMEs) in their task of maintaining an up-to-date knowledge base. The automated information extraction techniques supported by the active learning is language neutral. Specifically, the active learning shown herein does not use natural language parsing with parts of speech tagging. The calibration model evaluates the annotations and determines which annotations are suited for automatic extraction without further feedback, which annotations should be manually annotated, and which annotations should be discarded entirely.

The system and process as shown and described in FIGS. 1-3 may be applied to different scenarios including, but not limited to, autonomous vehicles, call centers, algorithmic trading, pharmacovigilance, food safety, consumer product safety, consumer sentiment, legal information extraction, and bank and financial services. In each of these scenarios, the active learning functions in a language neutral matter to leverage an existing or initial system, with the active learning aspect providing speed and efficiency for adaptation of the labeled data set to a new scenario or channel. With respect to autonomous vehicles, the active learning described herein may be applied to identify and correctly interpret traffic signs and traffic signal. For example, a model trained on traffic signs in one country may be utilized to learn to identify traffic signs in another country with minimal requirements for new labeled data and retraining. The active learning system described herein can identify what can be re-used from an initial model without the need for new labeled data and retraining for a new domain. The modified or new traffic signs will use active learning to reduce the labeling effort. With respect to algorithmic trading, detecting trends of stocks and stock markets is a crucial component. Prediction may be based on information extraction from textual sources, such as news articles or social media posts. A system that operates on a different stock market will have to be retrained on a new language. The language neutral system and process described in FIGS. 1-3 transfers knowledge that is common across different stock markets. Accordingly, regardless of the scenario, the active learning system and process described herein identifies common knowledge that can be re-used across different channels, and mitigates or avoids retraining for a new domain.

It is understood in the art that dictionary membership associated with expansion may be a subjective task. The dictionary expansion shown and described in FIGS. 1-3, mitigates or does not eliminate the subjectivity associated with membership by supporting limited acceptance of annotation membership from one or more neural models, and thereafter supports interaction of a human-in-the loop (HumL), e.g. SME, to control direction of the dictionary expansion, such as accepting or rejecting candidate entries, also referred to herein as selectively expanding the dictionary membership. In one embodiment, the HumL controls semantic drift at one or more iteration cycles. Once the dictionary has a sufficient number of entries, the dictionary expansion is complete.

In a technical scenario, the expanded dictionary may be applied against an unexplored corpus to identify contextually related data. For example, in the venue of medical and health care, medical reports need to be scanned for clinical issues, e.g. adverse medication reactions which might be caused by prescription medication(s). It is understood that new medications are periodically approved and available. Existing lexicons of adverse reactions need to be updated. Accordingly, an existing dictionary may be selected and applied to medical and health care venues to identify and expand relationships between existing medications, and to identify new medications.

Aspects of the dictionary expansion and application as shown in FIG. 1-3, employs one or more functional tools, as shown and described in FIG. 1. Aspects of the functional tools (152)-(158) and their associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
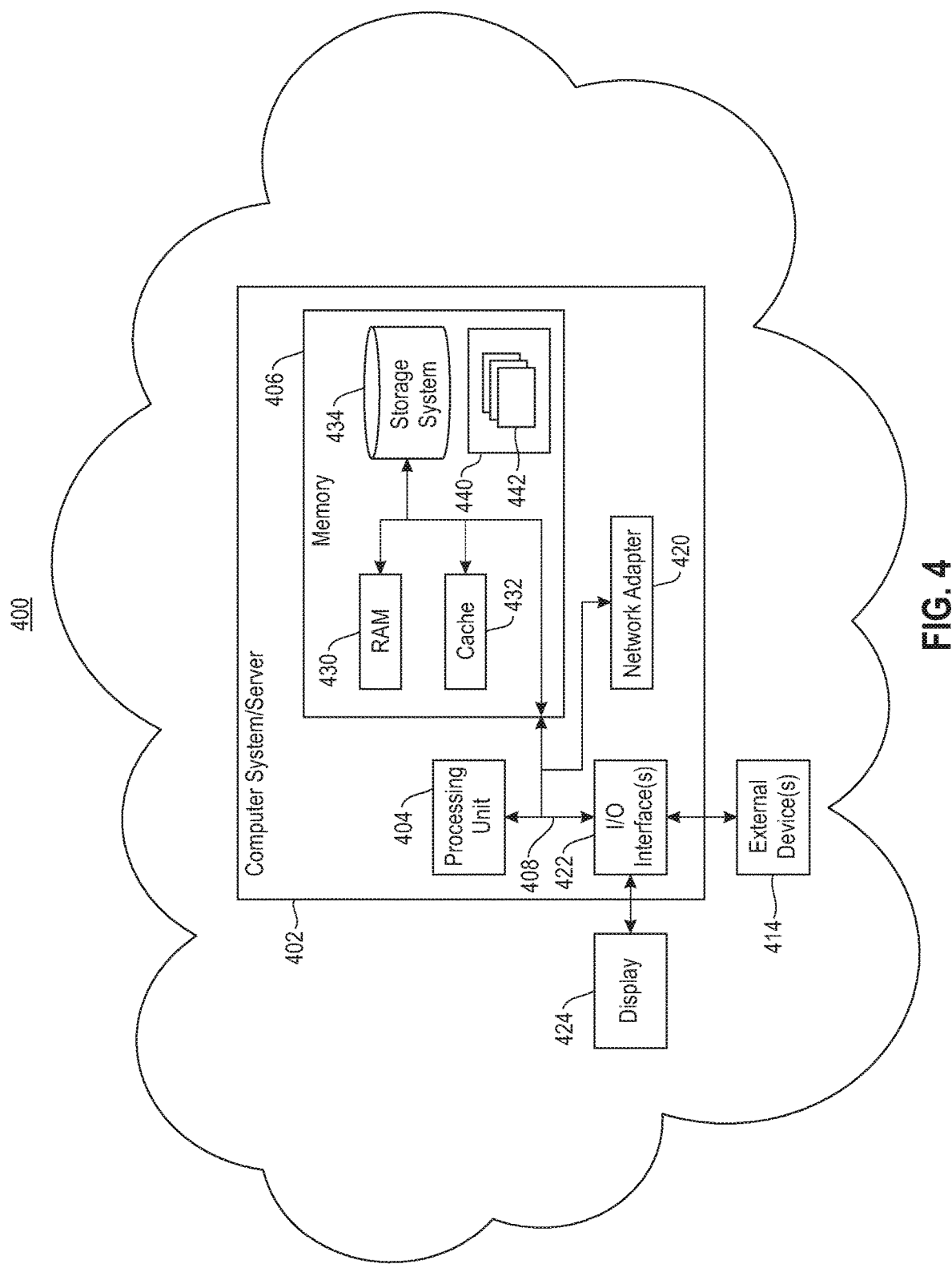
FIG. 4 depicts a block diagram illustrating an example of a computer system/server of a cloud based support system, to implement the system and processes described above with respect to FIGS. 1-3.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to iteratively expand one or more domain-specific dictionaries, and apply the expanded dictionary to an unexplored corpus to identify matching data within the corpus to the instances of the dictionary. For example, the set of program modules (442) may include the tools (152)-(156) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In one embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
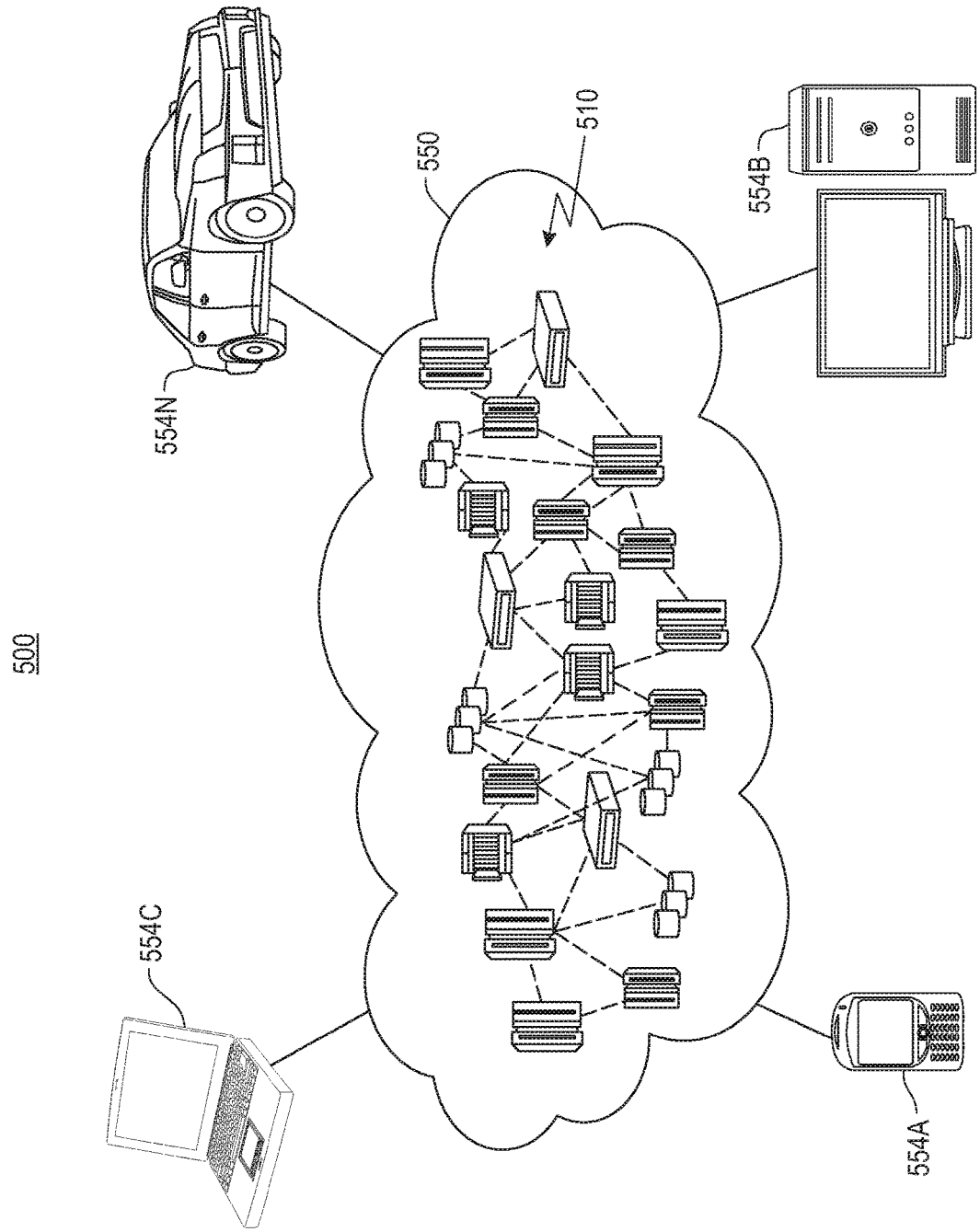
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
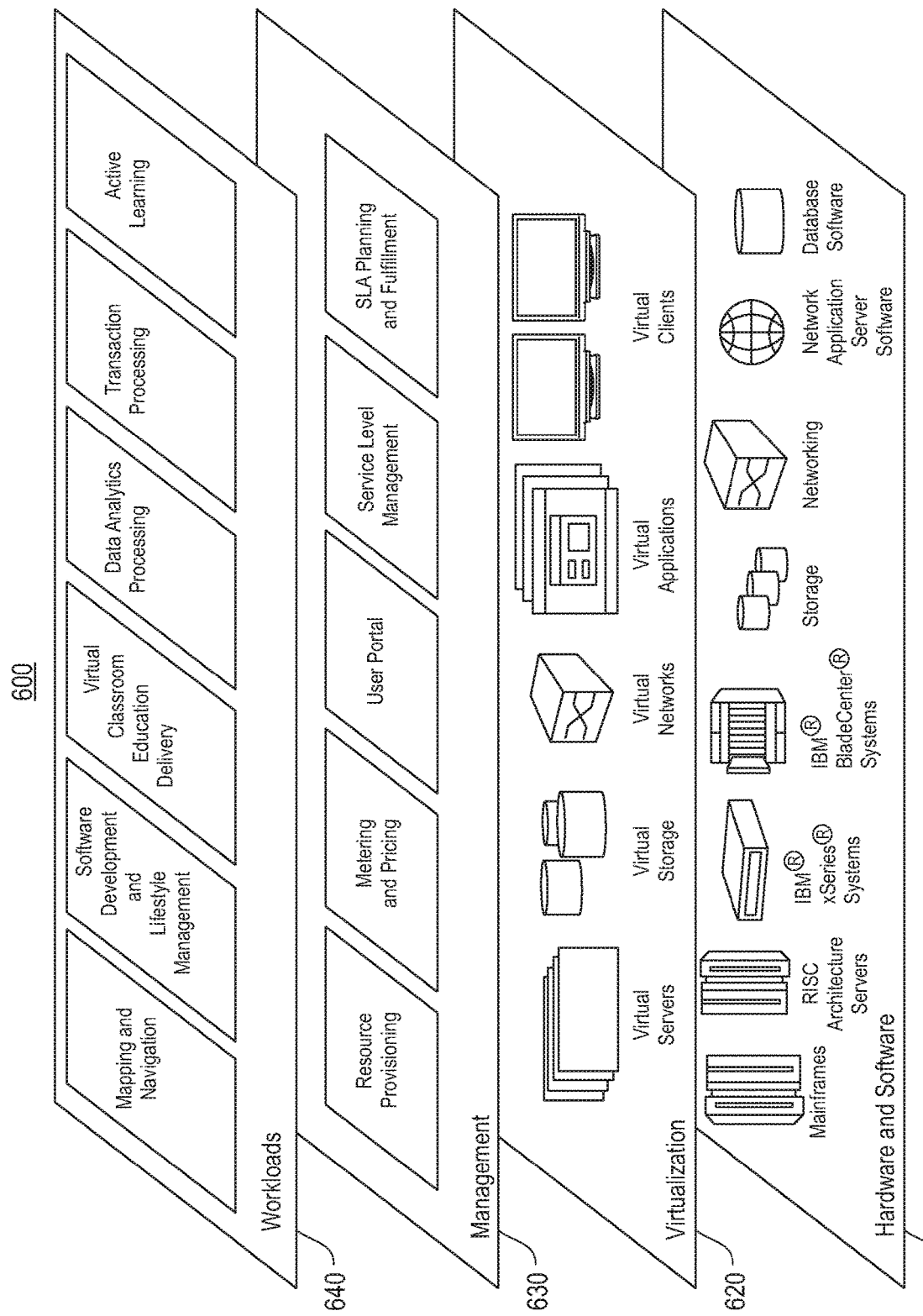
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and active learning.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to expand the dictionary and apply the expanded dictionary and dictionary instances to identify matching corpus data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the data storage and/or corpus may be localized, remote, or spread across multiple systems. Accordingly, the scope of protection of the embodiments is limited only by the following claims and their equivalents.

What is claimed is:

1. A computer system comprising:
  a processing unit operatively coupled to memory;
  an artificial intelligence (AI) platform in communication with the processing unit, the AI platform to manage information extraction, including:
    a machine learning manager to apply an unlabeled data set to two or more neural models for automated annotation, including the two or more neural models to preliminarily and automatically attach machine annotations to data elements within the unlabeled data set;

a data selector to evaluate the attached machine annotations for accuracy, including a calibration model to evaluate the attached machine annotations and assign a score to each machine annotation, wherein the assigned score reflects confidence of correctness of the individual machine annotations;

a director to calibrate the data selector, including the director to iteratively expand a labeled data set of selective evaluated machine annotations, wherein the selective and iterative expansion leverages the score attached to individual machine annotations; and an applicator to apply the iteratively expanded labeled data set to an unexplored corpus, and identify matching corpus data to populated instances of the labeled data set.

2. The computer system of claim 1, further comprising the data selector to train the two or more neural models with the labeled data set, including the data selector to remove annotated instances of the labeled data set from the unlabeled data set, and subject the unlabeled data set for automated annotation, including the two or more neural models to leverage the annotated instances of the labeled data set.

3. The computer system of claim 1, further comprising the data selector to subject machine annotations having a first score to a manual annotation, and to populate the manual annotations into the labeled data set.

4. The computer system of claim 3, wherein the annotated instances of the labeled data set are selected from the group consisting of: manual annotations having the attached first score, machine annotations having an attached second score, and combinations thereof.

5. The computer system of claim 4, wherein the iterative expansion of the labeled data set with selective evaluated annotations includes the data selector to optimize the labeled data set with machine annotations having the attached second score before manual annotations having the attached first score.

6. The computer system of claim 1, wherein the automated data annotation and the evaluation of the attached machine annotations is language neutral.

7. A computer program product for information extraction, the computer program product comprising a computer readable storage medium having program code embodied therewith, the program code executable by a processor to:

apply an unlabeled data set to two or more neural models for automated annotation, including the two or more neural models to preliminarily and automatically attach machine annotations to data elements within the unlabeled data set;

train a machine learning model to evaluate the attached machine annotations with respect to accuracy, including the machine learning model to subject the attached machine annotations to an evaluation and attach a score to each machine annotation, wherein the attached score reflects confidence of correctness of the individual machine annotations;

calibrate the machine learning model, including iteratively expand a labeled data set with selective evaluated annotations, wherein the selective and iterative expansion leverages the score attached to individual machine annotations;

apply the iteratively expanded labeled data set to an unexplored corpus to identify matching corpus data to populated instances of the labeled data set.

8. The computer program product of claim 7, further comprising the processor to train the two or more neural models with the labeled data set, including remove annotated instances of the labeled data set from the unlabeled data set, and subject the unlabeled data set for automated annotation using the two or more neural models and the annotated instances of the labeled data set.

9. The computer program product of claim 7, further comprising the processor to subject machine annotations having a first score to a manual annotation, and populate the manual annotations into the labeled data set.

10. The computer program product of claim 9, wherein the annotated instances of the labeled data set are selected from the group consisting of: manual annotations having an attached first score, machine annotations having an attached second score, and combinations thereof.

11. The computer program product of claim 10, wherein the iterative expansion of the labeled data set with selective evaluated annotations includes the processor to optimize the labeled data set with machine annotations having the attached second score before manual annotations having the attached first score.

12. The computer program product of claim 7, wherein the automated data annotation and the evaluation of the attached machine annotations is language neutral.

13. A computer implemented method for information extraction, the method comprising:

applying an unlabeled data set to two or more neural models for automated annotation, including the two or more neural models preliminarily and automatically attaching machine annotations to data elements within the unlabeled data set;

training a machine learning model to evaluate the attached machine annotations with respect to accuracy, including the machine learning model subjecting the attached machine annotations to an evaluation and attaching a score to each machine annotation, wherein the attached score reflects confidence of correctness of the individual machine annotations;

calibrating the machine learning model, including iteratively expanding a labeled data set with selective evaluated annotations, wherein the selective and iterative expansion leverages the score attached to individual machine annotations;

applying the iteratively expanded labeled data set to an unexplored corpus to identify matching corpus data to populated instances of the labeled data set.

14. The method of claim 13, further comprising training the two or more neural models with the labeled data set, including removing annotated instances of the labeled data set from the unlabeled data set, and subjecting the unlabeled data set for automated annotation using the two or more neural models and the annotated instances of the labeled data set.

15. The method of claim 13, further comprising subjecting machine annotations having a first score to a manual annotation, and populating the manual annotations into the labeled data set.

16. The method of claim 15, wherein the annotated instances of the labeled data set are selected from the group consisting of: manual annotations having an attached first score, machine annotations having an attached second score, and combinations thereof.

17. The method of claim 16, wherein the step of iteratively expanding the labeled data set with selective evaluated annotations includes optimizing the labeled data set with machine annotations having the attached second score before manual annotations having the attached first score.

18. The method of claim 13, wherein the automated data annotation and the evaluation of the attached machine annotations is language neutral.

* * * * *